United States Patent
Mathieu et al.

(10) Patent No.: US 10,071,715 B2
(45) Date of Patent: Sep. 11, 2018

(54) METHOD AND DEVICE FOR DETERMINING A BRAKING TORQUE ON A BRAKING SYSTEM FOR A RAIL VEHICLE

(71) Applicant: KNORR-BREMSE SYSTEME FÜR SCHIENENFAHRZEUGE GMBH, Munich (DE)

(72) Inventors: Michael Mathieu, Puchheim (DE); Roman Grepl, Munich (DE); Erich Fuderer, Fürstenfeldbruck (DE); Michael Schubert, Munich (DE); Marc-Gregory Elstorpff, Munich (DE); Rupert Lang, Schmidmühlen (DE)

(73) Assignee: KNORR-BREMSE SYSTEME FÜR SCHIENENFAHRZEUGE GMBH, Munich (DE)

( * ) Notice: Subject to any disclaimer, the term of this patent is extended or adjusted under 35 U.S.C. 154(b) by 131 days.

(21) Appl. No.: 14/889,673

(22) PCT Filed: May 9, 2014

(86) PCT No.: PCT/EP2014/059563
§ 371 (c)(1),
(2) Date: Feb. 17, 2016

(87) PCT Pub. No.: WO2014/184110
PCT Pub. Date: Nov. 20, 2014

(65) Prior Publication Data
US 2016/0229382 A1   Aug. 11, 2016

(30) Foreign Application Priority Data

May 13, 2013   (DE) .................. 10 2013 008 227

(51) Int. Cl.
*B60T 8/17* (2006.01)
*B60T 8/52* (2006.01)
(Continued)

(52) U.S. Cl.
CPC .............. *B60T 8/52* (2013.01); *B60T 8/1705* (2013.01); *F16D 55/2245* (2013.01); *F16D 66/00* (2013.01); *F16D 2066/005* (2013.01)

(58) Field of Classification Search
CPC .......... B60T 8/52; B60T 8/1705; B60T 17/22; B60T 17/228; B60T 2270/89;
(Continued)

(56) References Cited

U.S. PATENT DOCUMENTS

2006/0219486 A1 * 10/2006 Wagner .............. B61H 15/0028
  188/1.11 L
2012/0018260 A1 *  1/2012 Nock .................... B60T 8/1705
  188/72.1
2012/0097490 A1 *  4/2012 Vollert .................... F16D 55/02
  188/73.31

FOREIGN PATENT DOCUMENTS

DE       3627702 A1    2/1987
DE       9010026 U1   11/1991
(Continued)

OTHER PUBLICATIONS

Machine translation of WO2009/118350.*
(Continued)

*Primary Examiner* — Bradley T King
(74) *Attorney, Agent, or Firm* — Barnes & Thornburg LLP

(57) ABSTRACT

A method for determining a braking torque on a braking system for a rail vehicle. The braking system associated with at least one wheel or at least one wheelset includes at least one brake disc for generating a braking force in response to at least one brake signal, at least one brake lining interacting with the brake disc and a brake caliper connected to the brake lining and a brake housing and a securing bracket. The brake caliper is mounted together with a brake housing in at least one first bearing point and a second bearing point, the second bearing point is at a distance from the first bearing point at a predefined bearing distance, a first sensor for
(Continued)

providing a first measuring signal and a second sensor for providing a second measuring signal are arranged on the brake housing or between the housing and the bracket.

13 Claims, 5 Drawing Sheets

(51) Int. Cl.
  *F16D 55/224* (2006.01)
  *F16D 66/00* (2006.01)
(58) Field of Classification Search
  CPC ............. F16D 65/095; F16D 2066/005; F16C 65/095; F16C 2066/005
  See application file for complete search history.

(56) References Cited

FOREIGN PATENT DOCUMENTS

| DE | 4024811 A1 | 2/1992 |
| DE | 4425598 C1 | 12/1995 |
| DE | 10140021 A1 | 3/2003 |
| EP | 0777598 A2 | 6/1997 |
| EP | 1640233 A1 | 3/2006 |
| RU | 2283786 C1 | 9/2006 |
| SU | 1234258 A1 | 5/1986 |
| WO | 2009118350 A2 | 10/2009 |
| WO | 2010069520 A2 | 6/2010 |

OTHER PUBLICATIONS

Search Report for German Patent Application No. 10 2013 008 227.7; dated Mar. 13, 2014.

Search Report for International Patent Application No. PCT/EP2014/059563; dated Nov. 13, 2014.

Russian Office Action for corresponding application 2015153353/11 dated Dec. 12, 2016.

International Preliminary Report on Patentability for International Patent Application No. PCT/EP2014/059563; dated Nov. 17, 2015.

* cited by examiner

METHOD AND DEVICE FOR DETERMINING A BRAKING TORQUE ON A BRAKING SYSTEM FOR A RAIL VEHICLE

PRIORITY CLAIM

This patent application is a U.S. National Phase of International Patent Application No. PCT/EP2014/059563, filed 9 May 2014, which claims priority to German Patent Application No. 10 2013 008 227.7, filed 13 May 2013, the disclosures of which are incorporated herein by reference in their entirety.

FIELD

Disclosed embodiments relate to a method for determining a braking torque, to a corresponding method for outputting a braking signal, which method uses the braking torque, and to an apparatus for determining the braking torque and to an apparatus for outputting the braking signal to a brake system for a rail vehicle.

BACKGROUND

In brake systems of rail vehicles, the friction conditions between wheel or wheelset and rail, or between the brake disk and the brake pad assigned to the brake disk, fluctuate in a manner dependent on weather conditions, ambient temperature, state of wear and load profile, with the fluctuation sometimes being considerable. If it is now sought to regulate a braking torque acting on a wheelset of a rail vehicle, the braking torque generated by way of a brake caliper of a brake system should be measured with adequate accuracy. The braking torque generated at a brake disk is however dependent on a wide variety of factors such as, for example, a contact pressure force between pads and brake disk, a friction coefficient between the brake pad and a brake disk, or a friction radius which represents the spacing between the resultant friction force and the axis of the wheelset.

Since both a local contact pressure between the brake pad and the brake disk and also the friction coefficient of the brake pad on the brake disk are dependent on a multiplicity of factors (which in some cases exhibit high local variation), the friction radius is also not a fixed, unchanging value, which is however required for the regulation of the braking torque to be applied. Rather, during successive braking operations, fluctuations of the friction radius occur which cannot be disregarded. Causes for this include, for example, different starting temperatures of brake disk and brake pad, a different starting speed, a varying surface condition of the brake pad owing to thermal deformation, and/or wear of brake disk and brake pad.

The braking torque acting on a brake disk generally corresponds to the product of contact pressure force of the brake pads against the brake disk, the friction coefficient between the brake pad and the brake disk, and the present (possibly rapidly changing) friction radius.

If only the circumferential force is measured, which corresponds to a friction force acting on the brake disk, and the friction radius is assumed to be constant, the braking torque can be measured with only relatively low accuracy.

Disclosed embodiments provide for improved detection of a braking torque and thus for the control of a braking force with high accuracy.

Disclosed embodiments provide a method for determining a braking torque at a brake system for a rail vehicle, a method for outputting a braking signal for a braking force at a brake system for a rail vehicle, an apparatus for determining a braking torque at a brake system for a rail vehicle, and an apparatus for outputting a braking signal for a braking force at a brake system for a rail vehicle.

BRIEF DESCRIPTION OF THE FIGURES

Exemplary embodiments will be discussed in more detail below with reference to the appended drawings, in which.

DETAILED DESCRIPTION OF THE DISCLOSED EMBODIMENTS

Figure 1:
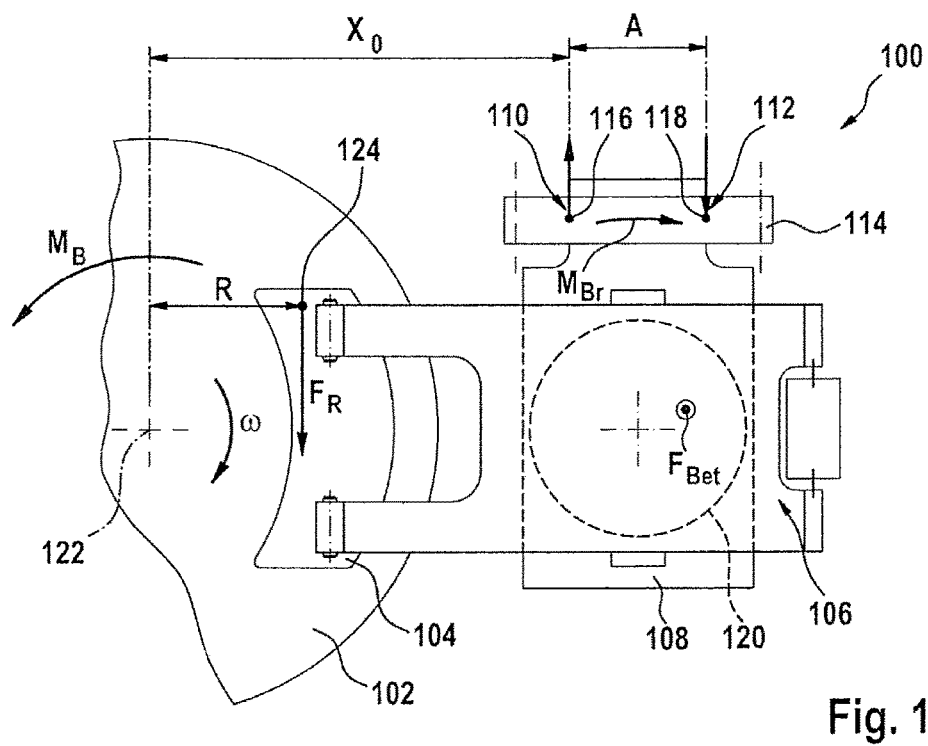
FIG. 1 is a schematic illustration of a side view of a brake system for a rail vehicle for use in an exemplary embodiment.

Disclosed embodiments provide a method for determining a braking torque at a brake system for a rail vehicle, wherein, to generate a braking force in response to a braking signal, the brake system, which is assigned to at least one wheel or at least one wheelset, comprises at least one brake disk, at least one brake pad which interacts with the brake disk, a brake caliper which is connected to the brake pad, and also a brake housing and/or a bracket, wherein the brake caliper is mounted by way of a brake housing at at least one first bearing point and one second bearing point, wherein the second bearing point is spaced apart from the first bearing point by a predefined bearing spacing, wherein a first sensor for providing a first measurement signal and at least one second sensor for providing a second measurement signal are arranged on the brake system and/or on the brake housing and/or between the brake housing and the bracket, and wherein the first measurement signal and the second measurement signal each represent a force, in particular a bearing force, or a value derived therefrom. The method has the following steps: reading in the first measurement signal and the second measurement signal; and detecting a braking torque using an installation dimension, the bearing spacing and the first measurement signal and the second measurement signal, wherein the installation dimension corresponds to the spacing between an axis of rotation of the brake disk and the first bearing point.

For deceleration or braking, rail vehicles have at least one brake. A rail vehicle may be understood generally to mean a rail-bound vehicle such as a locomotive, a rail motor set, a rail motor coach, a tram, an underground rail vehicle, or a wagon such as a passenger and/or freight car. The brake can act on a brake disk of a wheel or of a wheelset. Here, the brake may be operatively connected to a wheel, to a wheelset or to a multiplicity of wheels. To make the description simpler and easier to read, the approach proposed here will be described below only on the basis of one wheel, even though the approach proposed here can be implemented on multiple wheels or on a wheelset or on multiple wheelsets. The brake may be constructed from a multiplicity of components or elements; in particular, the brake may comprise a brake disk, at least one brake pad which interacts with the brake disk, a brake caliper which is operatively connected to the brake pad, and a force generator. The brake caliper may be pivotably connected to a bracket by way of two bearing points, wherein the two bearing points are arranged with a bearing spacing to one another. The brake disk has an axis of rotation which has a spacing to the (closer) first of the two bearing points, wherein the spacing can be referred to as installation dimension. Here, the installation dimension can be understood to mean a horizontal spacing as viewed in the installed state. The bracket may be fixedly connected to a chassis of the rail vehicle. An actuation of the brake may be performed in response to a braking signal. The braking signal may constitute a braking demand signal or a signal of a braking demand. Upon an actuation of the brake, a friction element of the brake, for example the brake pad, can counteract a wheel circumferential force which acts during the rotation of the wheel in the wheel circumferential direction or wheel direction of movement of the wheel or wheelset of the rail vehicle. In this way, a braking torque can be exerted by the brake pad on the brake disk and thus on the wheel. A force counteracting the wheel circumferential force can effect a deformation of at least one brake element. The deformation can be determined in one section of the brake element. During the actuation of the brake, a brake pad, which is operatively connected to the force generator via the brake caliper, can be pressed against the brake disk. A friction force acting between the brake disk and the brake pad can, in equilibrium therewith, exert forces in the brake caliper and on the two bearings of the brake caliper. In this way, the brake caliper is deformed. A first sensor and a second sensor are arranged on the brake caliper. The first sensor can provide a first measurement signal which represents a first force, a first bearing force at the first bearing point, or a value derived therefrom. Furthermore, the second sensor can provide a second measurement signal, which represents a second force, a second bearing force at the second bearing point, or a value derived therefrom. The first sensor and simultaneously or alternatively the at least second sensor may be a measurement bolt or alternatively a measurement element.

The approach proposed here is based on the realization that, by means of a known geometric arrangement of particular sensors and the positions of suspension thereof in conjunction with the values actually measured by the sensors, a braking torque can be detected in a very accurate manner. The braking torque can be detected in a very accurate manner even during travel, even though, for example, the spatial position of the sensors in relation to moving parts, such as the axis of the wheels or of the brake disk, may vary owing to changes in an action of the braking force. For example, using the approach proposed here, a change in the friction radius can be detected. The—theoretical—point of action of the brake pad on the brake disk can be influenced by external influences or environmental influences. The friction radius may also be reflected in a change in the braking torque exerted by the brake on the wheel, owing to a change in the spacing between the point of action of the brake pad on the brake disk and the axis of the wheel, or resultant point of action, owing to the lever effect. If it is now possible for the braking torque to be detected in a highly accurate manner, it is also possible to realize highly accurate readjustment of the braking torque, or of a force to be exerted on the brake disk, while the rail vehicle is in motion.

The approach proposed here thus offers, through the utilization of geometric relationships and a small number of sensors which are easy to produce and to install, a braking torque presently acting on a wheel can be detected in a highly accurate manner, and the braking torque can be used for highly accurate regulation of the actuation of the brake. In this way, it is possible to achieve highly accurate and metered braking of the rail vehicle, which would not be achievable without the use of the approach proposed here.

It is also expedient if, in at least one disclosed embodiment, the first measurement signal represents a first bearing force associated with the first bearing point and the second measurement signal represents a second bearing force associated with the second bearing point. A bearing force can be understood to mean a force which is exerted by the brake caliper on a bearing arranged at a corresponding bearing point. At the two bearing points by which the brake caliper is connected to the bracket, the brake caliper may be connected to the bracket by way of in each case one force measurement bolt. Upon an actuation of the brake, the two force measurement bolts can output a respective measurement signal which represents the bearing forces. Such an embodiment offers the benefit that, through the accurate knowledge of the two bearing forces in conjunction with the already known spacing between the two bearing points, it is possible for the braking torque exerted on the wheel by the brake system to be inferred by utilizing mechanical relationships, in particular the lever principle.

In at least one disclosed embodiment, the first measurement signal and the second measurement signal each represent a deformation of the brake system. The deformation of the brake system can be understood to mean a deformation of the brake caliper or of further brake elements. A deformation of the brake system can be understood to mean a bending of the brake system, or of a part thereof, caused by a force which, owing to the rotation of the brake disk, is exerted on a brake pad pressed against the brake disk. During an actuation of the brake, a friction force that acts between the brake disk and the brake pad can thus deform the brake system. Corresponding sensors, whose arrangement positions in the brake system are known, can measure a state of deformation of the brake system and, at the same time or alternatively, a stress in the brake system at two positions, and output a signal which represents the deformation of the brake system. In at least one disclosed embodiment, at least one measurement element may be arranged on the brake caliper of the brake system to provide the first and/or the second measurement signal(s). In at least one disclosed embodiment, at least one measurement element may be arranged on or in the housing or some other element of the brake system to provide the first and/or the second measurement signal(s). In at least one disclosed embodiment, a brake-application force may be detected. At least one disclosed embodiment offers the benefit that the use of an already known elasticity or stiffness of the brake system, of the brake caliper or of a further brake element can be additionally utilized to detect the braking torque. In this way, through the use of an (additional) further parameter, very high accuracy can be achieved in the detection of the braking torque.

Furthermore, in the detection step, a friction force may also be detected using the first measurement signal and the second measurement signal. It is also expedient if, in the detection step, a contact pressure force of the brake pad against the brake disk is detected using the first measurement signal and the second measurement signal, in particular when the brake disk is not in rotation and, in a standstill state, no friction force is transmitted. If the measurement signals each represent a bearing force, it is for example possible for the first and the second measurement signal to be added together to give a value which represents the friction force. For example, by means of such an approach, the friction force that arises at the two holders of the brake pad during a braking operation can be very easily detected from the sum of the two measured bearing forces, in particular with consideration being given to the signs thereof. Here, the sign of the detected friction force may then be dependent on the direction of travel. Such an embodiment offers the benefit that the friction force which leads to the braking of the wheel can be detected very accurately and in a technically simple manner. The friction force thus obtained can then, utilizing mechanical principles, be used to very easily detect the braking torque.

It is also expedient if, in at least one disclosed embodiment, in the detection step, a friction radius is detected using the installation dimension, the bearing spacing and the first measurement signal and the second measurement signal. The installation dimension and the bearing spacing are known owing to the construction of the brake system, and can be regarded as being constant. In the disclosed embodiments, through the utilization of mechanical principles, the braking torque can be detected in a technically very simple manner. It is for example possible to calculate a quotient of a measurement signal, in particular the second measurement signal, and the sum of the first measurement signal and of the second measurement signal. For example, the quotient may then be multiplied by the bearing spacing to obtain the spacing between one bearing point, in particular the first bearing point, and the resultant action point of the friction force. If the spacing determined from the bearing spacing and the quotient of the second measurement signal and the sum of the two measurement signals is subtracted from the installation dimension, a value for the friction radius can be directly determined. Since the spacing between the first bearing point of the brake caliper and the axis of rotation of the brake disk (that is to say the installation dimension) and the bearing spacing of the suspension points of the brake caliper are known, the presently effective friction radius R can be calculated for example in accordance with the following equation:

$$R = X_0 - A * F_2 / F_R,$$

where the variable R represents the friction radius, the variable A represents the bearing spacing, the variable $X_0$ represents the installation dimension, the variable $F_2$ represents the second bearing force and the variable $F_R$ represents the friction force. Such an embodiment offers the benefit of determining the friction radius in a highly accurate manner, and hereby also determining the braking torque in a highly accurate manner, through the utilization of a simple mechanical relationship.

In at least one disclosed embodiment, in the reading-in step, an item of information regarding a change in length of the installation dimension and, at the same time or alternatively, an item of information regarding a change in a position of an axis of the wheel in a tolerance range perpendicular to the direction of extent of the installation dimension, and in which, in the detection step, the braking torque and at the same time or alternatively the friction force and at the same time or alternatively the friction radius are detected using the item of information regarding a change in length and at the same time or alternatively the item of information regarding a change in a position. A direction of extent of the installation dimension can be understood to mean a measurement direction of the installation dimension. A change in a position of the axis of the wheel in a tolerance range perpendicular to the direction of extent of the installation dimension can be understood to mean a change in the position of the axis of the wheel in a direction which deviates from the direction of extent. In particular, this can thus be understood to mean a vertical change in the position of the axis of the wheel if the direction of extent is oriented in a horizontal direction, that is to say substantially parallel to the profile of a rail on which the rail vehicle travels. To be able to read in an item of information regarding a change in length of the installation dimension and at the same time or alternatively an item of information regarding a change in a position of an axis of the wheel in a tolerance range perpendicular to the direction of extent of the installation dimension, it is possible for at least one item of information from an additional sensor, for example from a length sensor, to be read in. To further increase the accuracy in the determination of the braking torque, it is possible, in such an embodiment, for the relative movements of the brake disk during travel to be taken into consideration. Owing to the primary suspension between the wheel or wheelset and bogie frame, the wheel or the wheelset can be displaced relative to the frame in a vertical direction depending on the state of loading. In addition or alternatively, elastic axle mounts, for example with rubber springs, may also permit a displacement in the vehicle longitudinal direction and in a transverse direction. As a result, the position of the brake disk relative to the brake caliper inevitably changes. The influence of the axis movement or these axis movements relative to the brake caliper can be taken into consideration in the calculation of the braking torque if the relative movement of the brake disk is known. If, at both axis mounts, the movements of the wheelset in one, in two or in all three directions are recorded for example by way of suitable travel sensors, it is thus possible, for the position of the brake disk on the axis, to relatively easily calculate the relative movement. For this purpose, the geometrical changes resulting from the axis displacement of the brake disk in relation to the first bearing point and the second bearing point can be determined, and the effects thereof taken into consideration in the determination of the forces or torques.

Furthermore, by means of the approach proposed here, a method for outputting a braking signal for a braking force at a brake system for a rail vehicle is proposed, wherein, to generate a braking force in response to a braking signal, the brake system, which is assigned to at least one wheel or at least one wheelset, comprises at least one brake disk, at least one brake pad which interacts with the brake disk, and a brake caliper which is connected to the brake pad, wherein the brake caliper is mounted by way of a brake housing at at least one first bearing point and one second bearing point, wherein the second bearing point is spaced apart from the first bearing point by a predefined bearing spacing, wherein a first sensor for providing a first measurement signal and a second sensor for providing a second measurement signal are arranged on the brake caliper, wherein the first measurement signal and the second measurement signal each represent a force, in particular a bearing force, or a value derived therefrom. The method for outputting a braking signal for a braking force at a brake system for a rail vehicle comprises the following steps: reading in a braking torque that has been determined by way of a variant of the method proposed here for determining a braking torque at a brake system for a rail vehicle, and determining a braking force using a desired setpoint braking torque and the read-in braking torque, to output a braking signal.

It is also expedient if, in the determination step, the braking force is determined using a friction force. An additional variable such as the friction force can permit more robust, and at the same time or alternatively faster, regulation and/or determination of the braking force to be imparted while the rail vehicle is in motion than has been achievable by way of previous approaches.

In an additional refinement of the stated method for outputting a braking signal, in the determination step, the braking force can be determined using a friction radius. Through the utilization of the lever effect of the braking radius, the braking force can be determined more quickly or more robustly, in particular because, in this way, changes in the braking radius can be very rapidly identified and taken into consideration in the determination of the presently required braking force.

Also proposed here is an apparatus for determining a braking torque at a brake system for a rail vehicle, wherein, to generate a braking force in response to a braking signal, the brake system, which is assigned to at least one wheel or at least one wheelset, comprises at least one brake disk, at least one brake pad which interacts with the brake disk, and a brake caliper which is connected to the brake pad, wherein the brake caliper is mounted by way of the brake housing at at least one first bearing point and one second bearing point, wherein the second bearing point is spaced apart from the first bearing point by a predefined bearing spacing, wherein a first sensor for providing a first measurement signal and a second sensor for providing a second measurement signal are arranged on the brake housing, wherein the first measurement signal and the second measurement signal each represent a force, in particular a bearing force, or a value derived therefrom, wherein the apparatus has the following steps: an interface for reading in the first measurement signal and the second measurement signal; and a device for detecting a braking torque using an installation dimension, the bearing spacing and the first measurement signal and the second measurement signal, wherein the installation dimension corresponds to the spacing between an axis of rotation of the brake disk and the first bearing point.

Thus, here, an apparatus for determining a braking torque at a brake system for a rail vehicle is proposed which is designed to carry out or implement the steps of the method for determining a braking torque at a brake system for a rail vehicle in corresponding interfaces and/or devices. Disclosed embodiments can be achieved in a quick and efficient manner also by means of an apparatus.

Also proposed is an apparatus for outputting a braking signal for a braking force at a brake system for a rail vehicle, wherein, to generate a braking force in response to a braking signal, the brake system, which is assigned to at least one wheel or at least one wheelset, comprises at least one brake disk, at least one brake pad which interacts with the brake disk, and a brake caliper which is connected to the brake pad, wherein the brake caliper is mounted by way of the brake housing at at least one first bearing point and one second bearing point, wherein the second bearing point is spaced apart from the first bearing point by a predefined bearing spacing, wherein a first sensor for providing a first measurement signal and a second sensor for providing a second measurement signal are arranged on the brake caliper, wherein the first measurement signal and the second measurement signal each represent a force, in particular a bearing force, or a value derived therefrom, wherein the apparatus has the following steps: an interface for reading in a braking torque; and a device for determining a braking force using a predetermined setpoint braking torque and the read-in braking torque, to output a braking signal.

The purpose of the disclosed embodiments can be achieved in a quick and efficient manner by means of an apparatus for outputting a braking signal for a braking force at a brake system for a rail vehicle. Here, an apparatus for triggering a braking signal for a braking force at a brake system for a rail vehicle is designed to carry out or implement the steps of the method for triggering a braking signal for a braking force at a brake system for a rail vehicle in corresponding interfaces and/or devices.

An apparatus may in the present case be understood to mean an electrical appliance which reads in sensor signals, processes them, and outputs control and/or data signals as a function thereof. The apparatus may have an interface, which may be in hardware and/or software form. In the case of a hardware embodiment, the interfaces may for example be part of a so-called system ASIC which encompasses a wide variety of functions of the control unit. It is however also possible for the interfaces to be dedicated integrated circuits, or to be at least partially composed of discrete components. In the case of a software embodiment, the interfaces may be software modules which are provided for example on a microcontroller in addition to other software modules.

Also disclosed is a computer program product having program code, which may be stored on a machine-readable carrier such as a semiconductor memory, a hard drive memory or an optical memory, and which is used to carry out the method according to one of the embodiments described above when the program code is executed on a computer or on an apparatus. Thus, the steps of the method defined in the program code can be implemented by devices of the computer or of the apparatus.

In the following description of the expedient exemplary embodiments, the same or similar reference signs will be used for elements of similar effect illustrated in the various drawings, wherein a description of the elements will not be repeated.

FIG. 1 is a schematic illustration of a side view of a brake system 100 for a rail vehicle for use in an exemplary embodiment. The brake system 100 has a brake disk 102, a brake pad 104 which acts on, or can be pressed against, the brake disk 102, and a brake caliper 106. The brake pad 104 is fastened to one end of the brake caliper 106. The brake caliper 106 is fastened by way of a brake housing 108 to a bracket 114 at two bearing points 110, 112. In the two bearing points 110, 112 there are arranged in each case one bolt 116, 118 for measuring forces on the bearing. Not directly visible, and shown by dashed lines, in FIG. 1 is a brake cylinder 120 by means of which the brake caliper 106 is operatively connected, that is to say in force-transmitting fashion, to the brake housing 108. While a rail vehicle to which the brake system 100 is fastened is in motion, the brake disk 102 rotates about an axis of rotation 122. The brake pad 104 is arranged laterally with respect to the brake disk 102, that is to say the brake pad 104 is arranged, within a tolerance range, parallel to a side surface of the brake disk 102. The surface of the brake pad 104 covers a sub-region of the side surface of the brake disk 102. The brake caliper 106 is U-shaped in the exemplary embodiment, wherein the two ends are connected to the brake pad 104, and on the end situated opposite the brake pad 104, there is arranged the brake cylinder 120 or a push rod adjuster, to be discussed in more detail below, for transmitting forces from the brake cylinder 120 to the brake caliper 106.

At the first bearing point 110 illustrated in FIG. 1, the brake housing 108 is connected to the bracket 114 by way of a first bolt 116. Analogously to this, at the second bearing point 112, the brake housing 108 is connected to the bracket 114 by way of a second bolt 118. The bolts 116 and 118 are each measurement bolts designed to measure the bearing forces acting at the respective bearing point 110, 112, and to correspondingly output a first measurement signal or a second measurement signal respectively. A measurement bolt 116, 118 may also be referred to as a measurement element 116, 118. In at least one exemplary embodiment, the two bolts 116, 118 may be one continuous bolt or continuous measurement bolt. A continuous bolt is illustrated for example in FIG. 4a.

In response to a braking signal, the brake pad 104 is pressed against the brake disk 102 by way of a boosting action of the brake cylinder 120, as per the detailed description given below. Here, the brake disk 102 may be rotating at an angular speed ω. In this way, at a point of action 124 between the brake pad 104 and the brake disk 102, the brake pad 104 is pressed with a braking force FB against the brake disk 102. The point of action 124 is arranged with a spacing R to the axis of rotation 122 of the brake disk 102, the spacing corresponding to the braking radius R. The spacing X0 between the axis of rotation 122 and the first bearing point 110 is in this case referred to as installation dimension X0. A spacing between the first bearing point 110 and the second bearing point 112 is referred to as bearing spacing A. The rotation of the brake disk 102 during a rotation of the wheel to which the brake disk 102 is fastened gives rise, at the point of action 124, to a friction force FR which is proportional to the braking force FB and which can be regarded as being oriented substantially perpendicular to a direction of extent of the brake caliper 106 between the brake pads 104 and the brake cylinder 120. A braking torque MB acting on the brake disk 102 can be determined from the friction force FR and/or the braking force FB and the friction radius R. For such a determination of the braking torque MB, use is made of the fact that the friction force FR or the braking force FB gives rise to a lever action of the brake caliper 106, which leads to a first bearing force F1 acting on the first bearing point 110 and to a second bearing force F2 acting on the second bearing point 112, which bearing forces can be measured by way of the measurement element 116 and 118.

Figure 2:
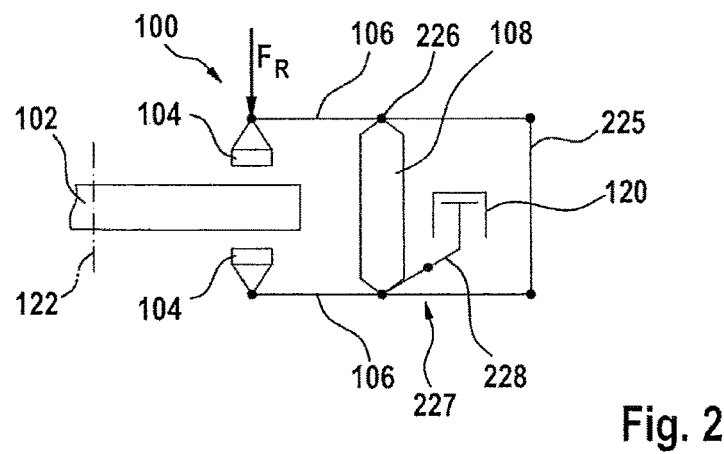
FIG. 2 is a schematic illustration of a plan view of a brake system for a rail vehicle for use in an exemplary embodiment.

FIG. 2 is a simple schematic illustration of a brake system 100 for a rail vehicle for use in an exemplary embodiment. The brake system 100 shown in FIG. 2 may thus be the brake system 100 described in FIG. 1, wherein the brake system is illustrated schematically in a plan view in FIG. 2. A brake caliper unit has two caliper levers 106, one end of which in each case is articulatedly connected to brake shoes 104, and the other end of which in each case is articulatedly connected to a push rod adjuster 225 which extends between the caliper levers. The central regions of the caliper levers 106 are coupled to a brake housing 108, wherein the coupling point of one caliper lever 106 may be a simple rotary bearing 226. The coupling point of the other caliper lever 106 is designed as an eccentric mechanism 227 which, via a crank arm 228, can be actuated by a brake cylinder 120, which is mounted in the housing, in a direction which brings the two caliper levers 106 closer together. The eccentric mechanism 227 has a shaft which is rotatable in the housing about an axis and which, with an eccentricity directed obliquely rearward and outward away from the brake disk 102, bears a peg with the spindle on which the caliper lever 106 is mounted. The eccentric mechanism 227 makes it possible to realize a high force transmission ratio with relatively short caliper levers 106.

In an exemplary embodiment, the brake cylinder 120 or alternatively the housing of the brake cylinder 120 may be connected to the brake housing 108.

Figure 3A:
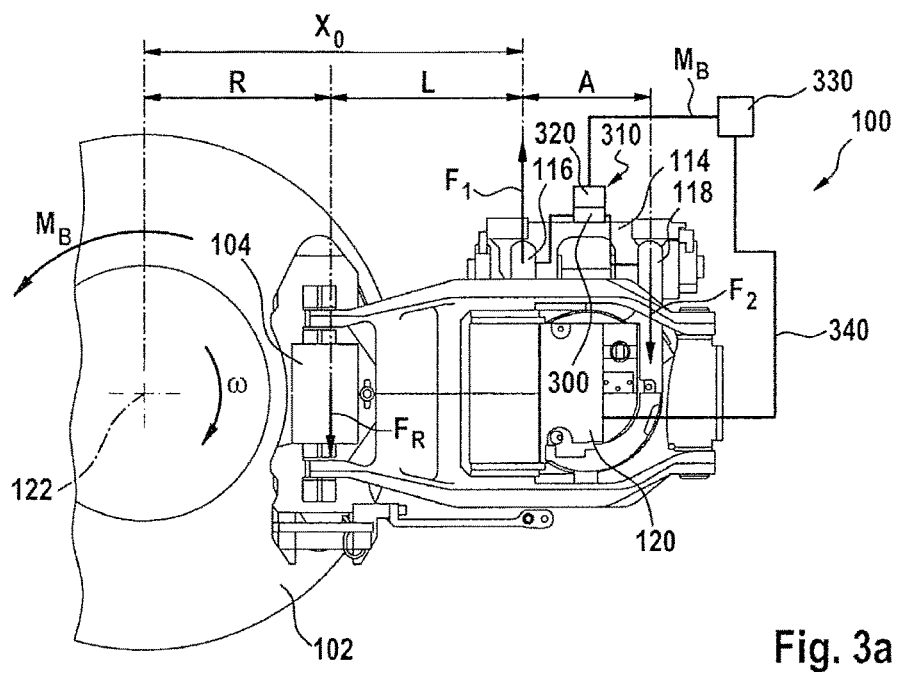
FIGS. 3a to 3c each show a schematic illustration of a brake system for a rail vehicle for use in an exemplary embodiment.
Figure 3B:
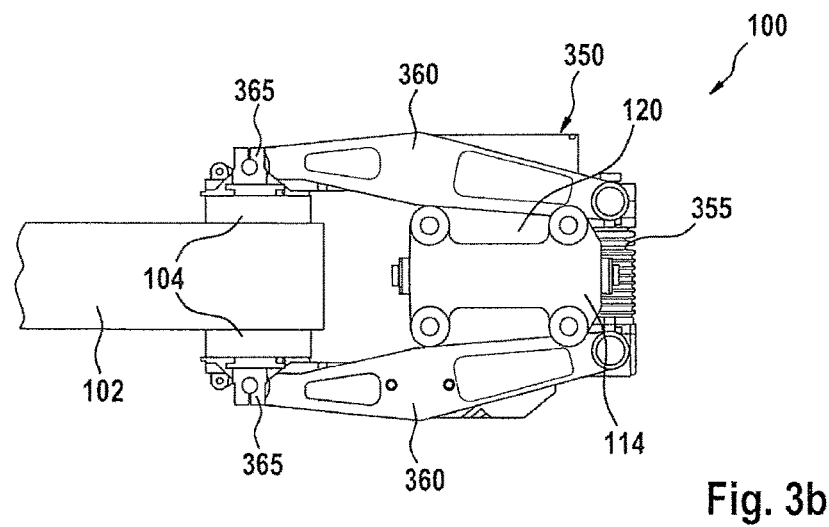
Figure 3C:
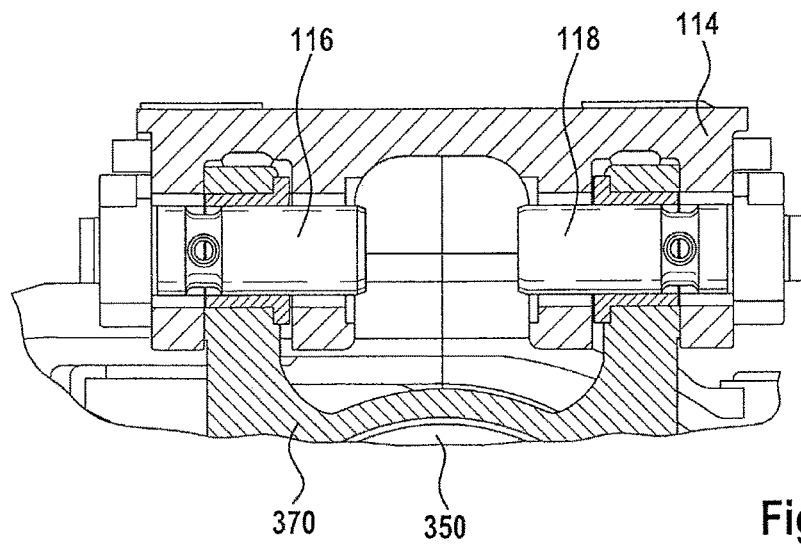

The following FIGS. 3a, 3b and 3c show different views of an exemplary embodiment of a brake system 100 for a rail vehicle. Here, the brake system 100, which is illustrated in FIG. 3a in a side view with spacings between individual elements being designated, is shown in a plan view in FIG. 3b. FIG. 3c shows a sectional view of a sub-region of the brake system 100, clearly showing the positions of the bearing points with the first measurement bolt and the second measurement bolt.

FIG. 3a is an illustration of a brake system 100 for a rail vehicle for use in an exemplary embodiment. Here, the elements and components already discussed in more detail with regard to FIG. 1 are illustrated again, wherein in this case, for better explanation of the determination of the braking torque MB, the spacings, and the designations of the spacings, of some of the elements of the brake system 100 are also indicated. Here, the first measurement signal provided by the first measurement bolt 116 and the second measurement signal provided by the second measurement bolt 118 may be read in by means of a reading-in interface 300 of an apparatus 310 illustrated in FIG. 3a. The first and second measurement signals may then be transmitted from the interface 300 into a device 320 for detecting the braking torque MB, in which the braking torque MB is determined for example in accordance with the approach described in more detail below. The detected braking torque MB is subsequently transmitted for example to an apparatus 330 for outputting a braking signal 340, which triggers a lengthening or shortening of the brake cylinder to vary the braking torque MB (presently acting on the brake disk 102) such that the braking torque corresponds, for example, to a desired setpoint braking torque. In this way, it is possible in a technically very simple manner for regulation of the braking force FB exerted on the brake disk 102 by the brake pads 104 to be implemented. The apparatus 310 for determining the braking torque MB and the apparatus 330 for outputting the braking signal 340 are illustrated and arranged in FIG. 3a merely by way of example. The apparatuses 310 and 330 therefore need not actually be installed at the positions illustrated in FIG. 3a, but may be installed at any desired location in the brake system 100 or in the rail vehicle generally.

FIG. 3b is an illustration showing a plan view of the brake system 100 illustrated in FIG. 3a. The illustration of FIG. 3b shows in particular a force generator 350 of the brake cylinder 120, which force generator generates an actuation force which, via a lever transmission mechanism, is transmitted to one of the caliper levers 360 at a brake pad 104. At the caliper lever 360, the force is transmitted via the push rod adjuster 355 to the second caliper lever 360, which brings the second brake pad 104 into contact with the brake disk. Thus, the actuation force FBet is now converted into the braking force FB by virtue of the brake pads 104 attached to the pad holders being pressed against the brake disk 102.

FIG. 3c shows a sectional view of a sub-region of the brake system 100. FIG. 3c shows the position of the first measurement bolt 116 and of the second measurement bolt 118 which are respectively arranged, at the fastening point, in the first bearing point 110 and second bearing point 112 of the brake housing 370 on the bracket 114. Illustrated in the lower sub-region of the sectional illustration from FIG. 3c is the housing into which the force generator 350 of the brake cylinder 120 is integrated.

Figure 4A:
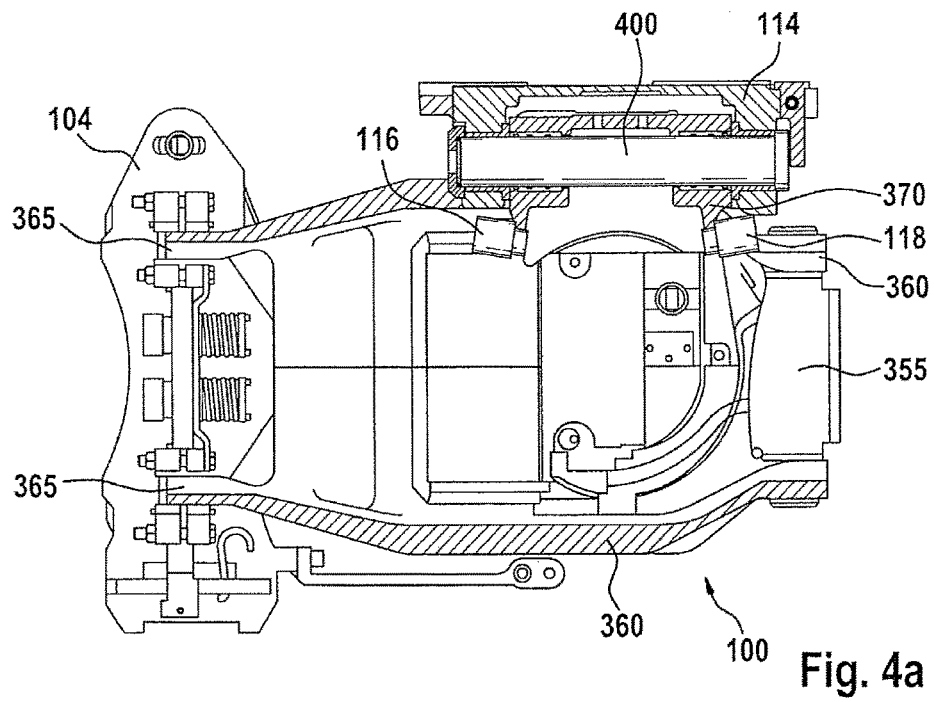
FIGS. 4a to 4b each show a schematic illustration of a brake system for a rail vehicle for use in an exemplary embodiment.

FIG. 4a is a sectional illustration through a part of the brake system 100 according to a further exemplary embodiment. Here, it can be seen that a connection between the bracket 114 and the brake caliper 106 is realized by way of a suspension bolt 400, wherein the suspension bolt 400 is led through a bore of the housing 370 of the force generator 350. The first measurement element 116 and the second measurement element 118 are in each case installed between the housing 370 of the force generator 350 and a suspension 400, such that the measurement elements can measure a deformation transmitted through the housing 370 by the respectively adjacent caliper lever 360. The deformation is proportional to the—applied—force.

Figure 4B:
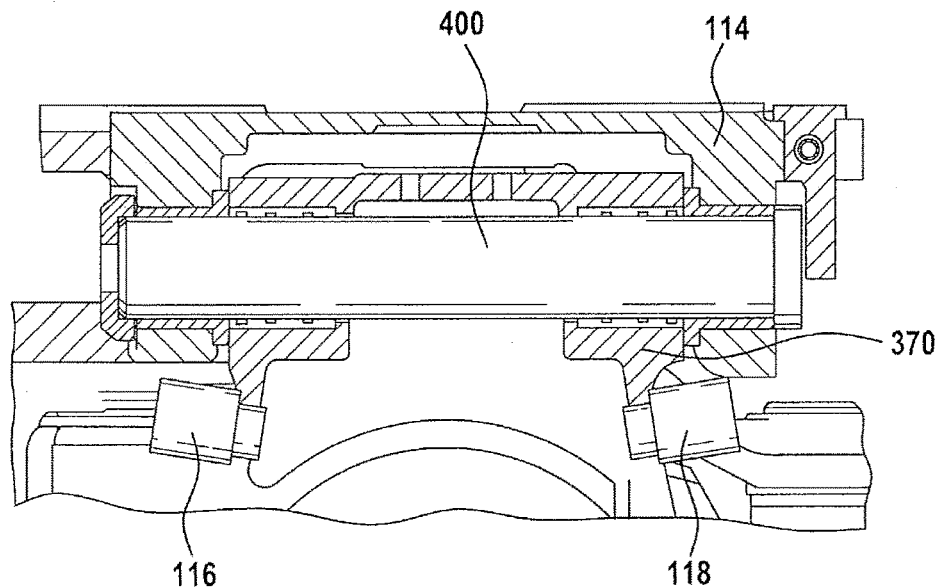

FIG. 4b shows the particularly relevant region from FIG. 4a in an enlarged illustration.

To detect the braking torque which acts on a brake disk 102 during a braking operation, it is thus possible for two sensors 116 and 118 to be respectively positioned, with a known spacing A, in the brake system 100 and at the suspension points between in each case one caliper lever 360 and a housing 370 of the force generator 350. The sensors 116 and 118 may be arranged or positioned here such that, firstly, the friction force FR between brake pad and brake disk and, secondly, a bending moment which is introduced into the brake caliper by the friction force can be determined. By means of the two measured values and the known dimensions of the brake caliper and of the bogie, or of the bracket, it is thus possible, in a control or detection module 310, for the present friction radius R and, together with the detected friction force FR, the presently acting braking torque MB to be calculated. The variables or values determined in the control or detection module 310 can be provided to a regulation module 330 for the operation of the brake system and/or for the outputting of a braking signal for the regulation of the actuation force FBet. In addition or at the same time, the determined variables or values may be displayed on a display, in particular for a person in the rail vehicle. The displayed variables or values may assist a person in controlling the rail vehicle.

In the region of the suspension or of the suspension bolts 400, the housing 370 of the force generator 350 (compact calipers) is subjected to load only by the inherent weight of the brake caliper 106 and by the action of the friction force FR on the pads 104. If, in the region, the state of stress or deformation is measured at two locations, it is thus possible for the load transmitted through the brake caliper 106 to be uniquely detected. With corresponding calibration of the sensor arrangement, it is possible for the friction force FR and the acting lever arm L to be determined from the measurement, and for the friction radius R relevant for the braking torque MB to be calculated.

The brake caliper unit or the brake system 100 is thus mounted pivotably in the bracket 114 by means of the two force measurement bolts 116 and 118. The bracket 114 is fixedly screwed to the bogie frame of the (rail) vehicle. The brake caliper 106 is suspended by way of the housing 108 in the bracket 114 at two bearing points. The bearing bolts 116 and 118 are formed as separate force measurement bolts.

During a braking operation, the two bearing forces F1 and F2 that arise can be measured very accurately. It is thus possible for the braking torque MB acting on the brake disk 102 to be determined in accordance with the following relationship:

$$M_B = F_R * R, \text{ or}$$

$$M_B = F_R * X_0 - F_2 * A$$

Figure 5:
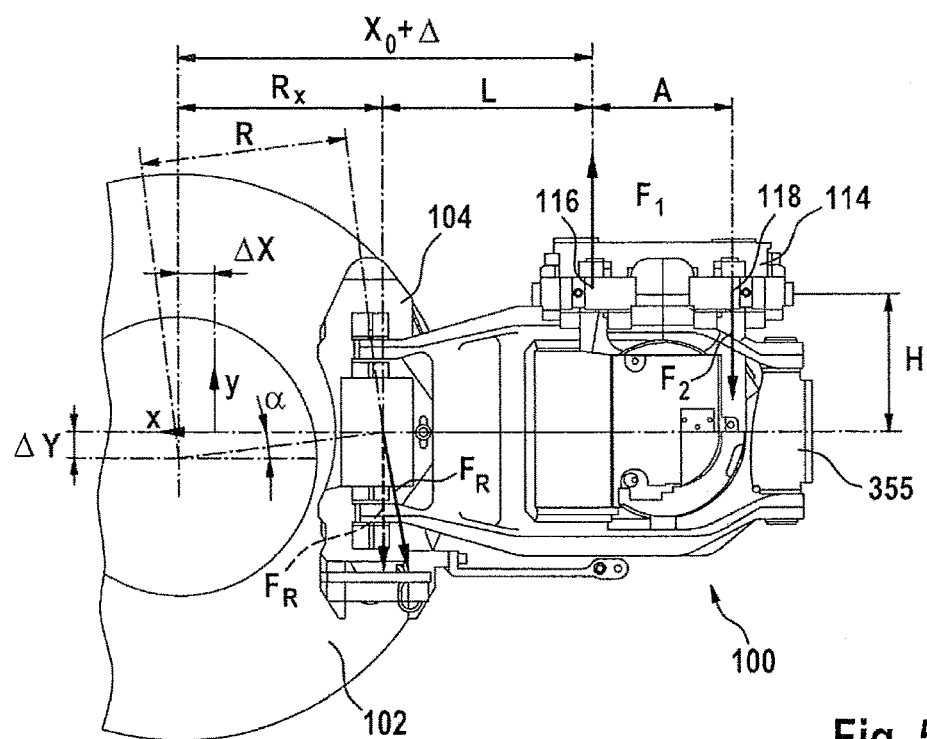
FIG. 5 is a schematic illustration of a brake system, with potential axis movement of the brake disk in relation to the bracket, for a rail vehicle for use in an exemplary embodiment.

FIG. 5 is an illustration of a brake system 100, with potential axis movement of the brake disk 102 in relation to the bracket 114, for a rail vehicle for use in an exemplary embodiment. The brake system 100 may be a brake system 100 as already illustrated in FIG. 3a. Here, the axis of rotation 122 in FIG. 5 has been displaced in relation to the axis of rotation 122 illustrated in FIG. 3a. The displacement of the axis of rotation 122 in relation to the bracket 114 gives rise to new geometric relationships, which also have an effect on the forces acting in the brake system 100.

Furthermore, with the approach proposed here, it is possible for an axis displacement during the braking operation to additionally be taken into consideration in the determination of the braking torque. In this regard, FIG. 5 illustrates a displacement of the wheel axis, and thus of the central point or center of rotation of the brake disk 102, the in a vertical direction ΔY and in a longitudinal direction of the vehicle ΔX. If the displacements or the displacement distances ΔX and ΔY are known, it is possible for the braking torque MB to be calculated from the known geometry and the measured forces in the bearing points. If the angle α shown in FIG. 5 is calculated approximately using a value for Rx (that is to say the fraction of the radius component in the x direction, that is to say in the direction parallel to a rail profile) in a central position, then the braking torque can be determined with relatively little error by way of simple (geometric) equations.

If it is attempted to determine an exact braking torque by way of a sensor 116 or 118 mounted remote from the point of force action, that is to say from the friction point 124 between the brake pad 104 and the brake disk 102, it has been found that fluctuations of the friction point 124 (which in reality covers an areal extent), that is to say ultimately of the friction radius, cannot be resolved with adequate accuracy. If only one force value, for example F1 or F2, is available, it is not possible to numerically calculate an exact value for the braking torque MB—this remains an unknown. Through the simultaneous detection by measurement of both forces F1 and F2, and from exactly known geometrical locations thereof, the equation system for the forces and torques is fully determinate. The approach proposed here consists, in particular, in the use of two mutually spaced-apart deformation and/or force sensors 116 and 118 which are attached (for example operatively connected) in force-transmitting fashion to the force-transmitting elements of the brake, such as the housing 370.

It can be stated that one of the sensors 116 and 118, if fitted correspondingly, can also be used for measuring a deformation force which does not arise from the direct braking-related friction force FR. Thus, when the brake disk or wheelset is not rotating (that is to say when the vehicle is at a standstill), the sensor can measure the actuation force (for the purpose of analyzing for correct function). Here, the measurement bolts 116 and 118 may be arranged in accordance with the positioning illustrated in FIG. 3a or FIG. 4a, wherein, in the figures, the basic subject matter, and for example the localization of the sensors at the disk brake of a rail vehicle, is shown also for use for the measurement of the deformation of at least one component of the brake system 100. The deformation measurement in the force flow of a brake assembly which is acted on by a braking force FB yields, in a mathematical derivation of the measured reaction forces F1 and F2, the exact friction force FR acting at the point of origin. Here, the sensors 116 and 118 may be mounted on or inserted into the bracket 114, the suspension bolt 400 and/or the brake housing 370, as can be seen from FIGS. 4a and 4b.

Figure 6:
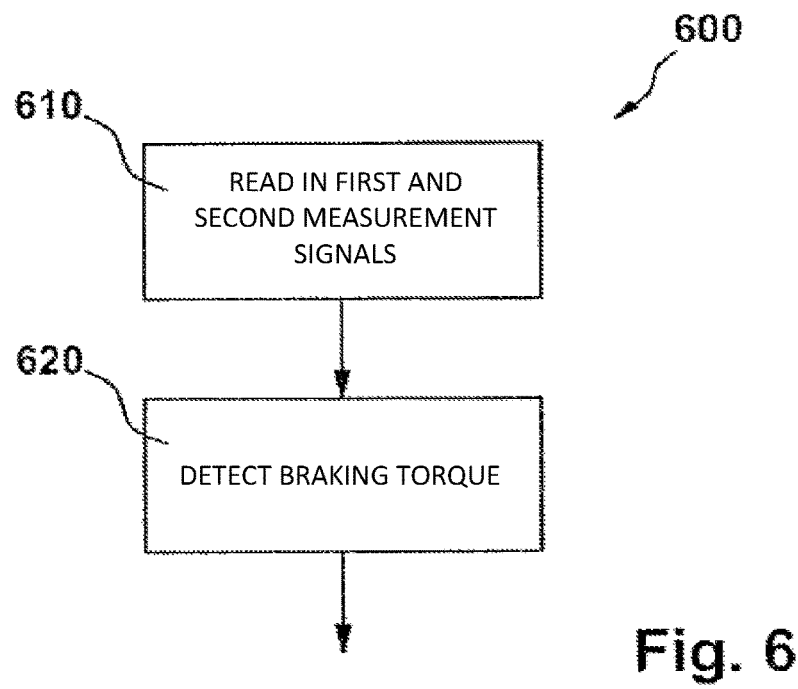
FIG. 6 shows a flow diagram of a method for determining a braking torque at a brake system for a rail vehicle for use in an exemplary embodiment.

FIG. 6 shows a flow diagram of a method 600 for determining a braking torque at a brake system for a rail vehicle. Here, the brake system comprises at least one brake system, assigned to a wheel or to at least one wheelset, for generating a braking force in response to a braking signal, at least one brake disk, at least one brake pad which interacts with the brake disk, and a brake caliper which is connected to the brake pad. The brake caliper is mounted at at least one first bearing point and one second bearing point, wherein the second bearing point is spaced apart by a predefined bearing spacing from the first bearing point, wherein a first sensor for providing a first measurement signal and a second sensor for providing a second measurement signal are arranged on the brake caliper, wherein the first measurement signal and the second measurement signal each represent a force, in particular a bearing force, or a value derived therefrom. The method 600 comprises a step 610 of reading in the first measurement signal and the second measurement signal. Furthermore, the method 600 comprises a step 620 of detecting a braking torque using an installation dimension, the bearing spacing and the first measurement signal and the second measurement signal, wherein the installation dimension corresponds to the spacing between an axis of rotation of the brake disk and the first bearing point.

Figure 7:
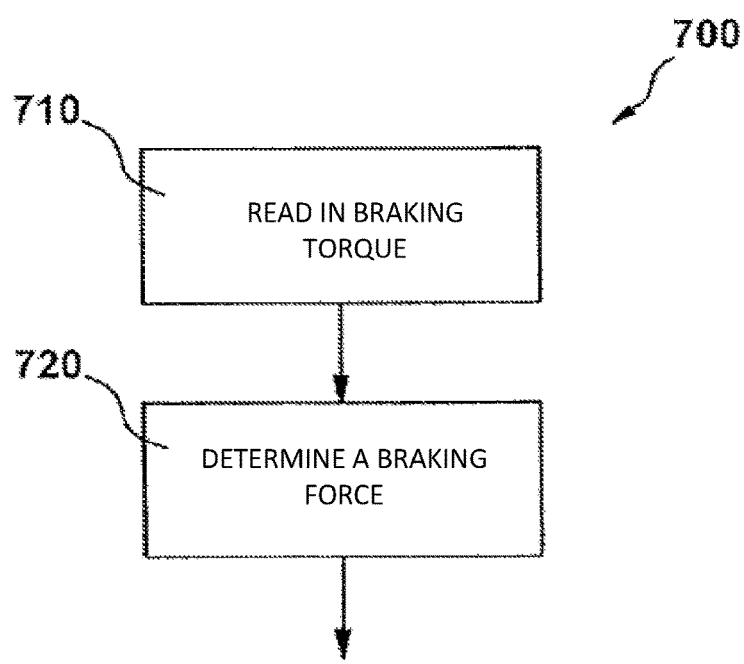
FIG. 7 shows a flow diagram of a method for triggering a braking signal for a braking force at a brake system for a rail vehicle for use in an exemplary embodiment.

FIG. 7 shows a flow diagram of a method 700 for outputting a braking signal for a braking force at a brake system for a rail vehicle for use in an exemplary embodiment. Here, the brake system comprises at least one brake system, assigned to a wheel or to at least one wheelset, for generating a braking force in response to a braking signal, at least one brake disk, at least one brake pad which interacts with the brake disk, and a brake caliper which is connected to the brake pad. The brake caliper is mounted at at least one first bearing point and one second bearing point, wherein the second bearing point is spaced apart by a predefined bearing spacing from the first bearing point, wherein a first sensor for providing a first measurement signal and a second sensor for providing a second measurement signal are arranged on the brake caliper, wherein the first measurement signal and the second measurement signal each represent a force, in particular a bearing force, or a value derived therefrom. The method 700 comprises a step of reading in 710 a braking torque that has been determined through carrying out a variant of a method for determining a braking torque. Furthermore, the method 700 comprises a step of determining 720 a braking force using a predetermined setpoint braking torque and the read-in braking torque, to output a braking signal.

The exemplary embodiments described have been selected merely by way of example, and may be combined with one another.

In brake systems of rail vehicles, the friction conditions between wheel or wheelset and rail, or between the brake disk and the brake pad assigned to the brake disk, fluctuate in a manner dependent on weather conditions, ambient temperature, state of wear and load profile, with the fluctuation sometimes being considerable. If it is now sought to regulate a braking torque acting on a wheelset of a rail vehicle, the braking torque generated by way of a brake caliper of a brake system should be measured with adequate accuracy. The braking torque generated at a brake disk is however dependent on a wide variety of factors such as, for example, a contact pressure force between pads and brake disk, a friction coefficient between the brake pad and a brake disk, or a friction radius which represents the spacing between the resultant friction force and the axis of the wheelset.

Since both a local contact pressure between the brake pad and the brake disk and also the friction coefficient of the brake pad on the brake disk are dependent on a multiplicity of factors (which in some cases exhibit high local variation), the friction radius is also not a fixed, unchanging value, which is however required for the regulation of the braking torque to be applied. Rather, during successive braking operations, fluctuations of the friction radius occur which cannot be disregarded. Causes for this include, for example, different starting temperatures of brake disk and brake pad, a different starting speed, a varying surface condition of the brake pad owing to thermal deformation, and/or wear of brake disk and brake pad.

The braking torque acting on a brake disk generally corresponds to the product of contact pressure force of the brake pads against the brake disk, the friction coefficient between the brake pad and the brake disk, and the present (possibly rapidly changing) friction radius.

If only the circumferential force is measured, which corresponds to a friction force acting on the brake disk, and the friction radius is assumed to be constant, the braking torque can be measured with only relatively low accuracy.

Document WO 2009/118350 A2 describes how one or more sensors should be attached to a brake caliper unit to measure the friction force between pad and brake disk. If the friction radius increases while the friction force remains the same, the braking torque becomes greater in reality, whereas the friction force measurement registers no change in friction force. If only one sensor is used, it would even be the case that a reduction in friction force, and thus a reduction in braking torque, would be detected, which would lead to a "correction" in the wrong direction in the regulation loop. On the basis of the approach described in document WO 2009/118350 A2, it is not possible for the deceleration force on the vehicle to be calculated with high accuracy.

WO 2010/069520 describes a method for regulating the braking force and/or the braking torque.

EP 0777598B1 discloses a brake caliper unit for disk brakes of vehicles, in particular rail vehicles, wherein an eccentric mechanism is used.

LIST OF REFERENCE SIGNS

100 Brake system
102 Brake disk
104 Brake pad
106 Brake caliper
108 Brake housing
110 First bearing point
112 Second bearing point
114 Bracket
116 First bolt, first measurement element
118 Second bolt, second measurement element
120 Brake cylinder
122 Axis of rotation
124 Point of action
R Friction radius
A Bearing spacing X₀ Installation dimension
F_R Friction force
F₁ First bearing force
F₂ Second bearing force
M_B Braking torque
F_Bet Actuation force
F_B Braking force
225 Push rod adjuster
226 Rotary bearing
227 Eccentric mechanism
228 Crank arm
300 Interface for reading in a first and a second measurement signal
310 Determination apparatus
320 Detection device
330 Apparatus for outputting a braking signal
340 Braking signal
350 Force generator
355 Push rod adjuster
360 Caliper lever
365 Fastening unit for holding the brake pad
370 Housing of the force generator
400 Suspension bolt
600 Method for determining a braking torque
610 Reading-in step
620 Detection step
700 Method for outputting a braking signal
710 Reading-in step
720 Determination step

The invention claimed is:

1. A method for determining a braking torque at a brake system for a rail vehicle, wherein, to generate a braking force in response to a braking signal, the brake system, which is assigned to at least one wheel or at least one wheelset, comprises at least one brake disk, at least one brake pad which interacts with the brake disk, a brake caliper which is connected to the brake pad, and also connected to one of a brake housing and a bracket, wherein the brake caliper is mounted by way of a brake housing at at least one first bearing point and one second bearing point, wherein the second bearing point is spaced apart from the first bearing point by a predefined bearing spacing, wherein a first sensor for providing a first measurement signal and at least one second sensor for providing a second measurement signal are arranged on the brake system, wherein the first measurement signal and the second measurement signal each represent a bearing force, or a value derived therefrom, the method comprising:
reading in the first measurement signal and the second measurement signal; and
detecting a braking torque using an installation dimension, the bearing spacing and the first measurement signal and the second measurement signal, wherein the installation dimension corresponds to the spacing between an axis of rotation of the brake disk and the first bearing point, and
generating a braking force in response to the detected braking torque.

2. The method of claim 1, wherein, the first measurement signal represents a first bearing force associated with the first bearing point, and the second measurement signal represents a second bearing force associated with the second bearing point.

3. The method of claim 1, wherein, in the detection step, a friction force is detected using the first measurement signal and the second measurement signal.

4. The method of claim 1, wherein, in the reading-in step, a first and a second measurement signal are read in, wherein the first measurement signal and the second measurement signal each represent a deformation in the brake system.

5. The method of claim 4, wherein, in the detection step, a contact pressure force of the brake pad against the brake disk is detected using the first measurement signal and the second measurement signal, when the brake disk is not in rotation and, in a standstill state, no friction force is transmitted.

6. The method of claim 1, wherein, in the detection step, a friction radius is detected using the installation dimension, the bearing spacing and the first measurement signal and the second measurement signal, wherein the friction radius represents a spacing between an axis of rotation of the wheel and a resultant point of action of the brake pad on the brake disk.

7. The method of claim 1, wherein, in the reading-in step, an item of information regarding a change in length of the installation dimension and/or an item of information regarding a change in a position of an axis of the wheel in a tolerance range perpendicular to the direction of extent of the installation dimension are/is read in, and wherein, in the detection step, the braking torque and/or the friction force and/or the friction radius are/is detected using the item of information regarding a change in length and/or the item of information regarding a change in a position.

8. The method of claim 7, wherein, in the determination step, the braking force is determined using a friction radius.

9. A non-transitory computer program product having program code that, when executed, carries out the method of claim 1.

10. A method for outputting a braking signal for a braking force at a brake system for a rail vehicle, wherein, to generate a braking force in response to a braking signal, the brake system, which is assigned to at least one wheel or at least one wheelset, comprises at least one brake disk, at least one brake pad which interacts with the brake disk, and a brake caliper which is connected to the brake pad, wherein the brake caliper is mounted by way of a brake housing at at least one first bearing point and one second bearing point, wherein the second bearing point is spaced apart from the first bearing point by a predefined bearing spacing, wherein a first sensor for providing a first measurement signal and a second sensor for providing a second measurement signal are arranged on the brake caliper, wherein the first measurement signal and the second measurement signal each represent a bearing force, or a value derived therefrom, the method comprising:
reading in a braking torque that has been detected as recited in claim 1, and
determining a braking force using a predetermined set-point braking torque and the read-in braking torque to output a braking signal and generating a braking force in response to the output braking signal.

11. The method of claim 10, wherein, in the determination step, the braking force is determined using a friction force.

12. An apparatus for determining a braking torque at a brake system for a rail vehicle, wherein, to generate a braking force in response to a braking signal, the brake system, which is assigned to at least one wheel or at least one wheelset, comprises at least one brake disk, at least one brake pad which interacts with the brake disk, and a brake caliper which is connected to the brake pad, wherein the brake caliper is mounted by way of the brake housing at at least one first bearing point and one second bearing point, wherein the second bearing point is spaced apart from the first bearing point by a predefined bearing spacing, wherein a first sensor for providing a first measurement signal and a second sensor for providing a second measurement signal are arranged either on the brake housing or between the brake housing and the bracket, wherein the first measurement signal and the second measurement signal each represent a bearing force, or a value derived therefrom, the apparatus comprising:
- an interface for reading in the first measurement signal and the second measurement signal; and
- a device configured to detect a braking torque using an installation dimension, the bearing spacing and the first measurement signal and the second measurement signal, wherein the installation dimension corresponds to the spacing between an axis of rotation of the brake disk and the first bearing point, wherein the braking system is configured to generate a braking force in response to the detected braking torque.

13. An apparatus for outputting a braking signal for a braking force at a brake system for a rail vehicle, wherein, to generate a braking force in response to a braking signal, the brake system, which is assigned to at least one wheel or at least one wheelset, comprises at least one brake disk, at least one brake pad which interacts with the brake disk, and a brake caliper which is connected to the brake pad, wherein the brake caliper is mounted by way of the brake housing at at least one first bearing point and one second bearing point, wherein the second bearing point is spaced apart from the first bearing point by a predefined bearing spacing, wherein a first sensor for providing a first measurement signal and a second sensor for providing a second measurement signal are arranged on the brake caliper, wherein the first measurement signal and the second measurement signal each represent a bearing force, or a value derived therefrom, the apparatus comprising:
- an interface for reading in the first measurement signal and the second measurement signal; and
- a device configured to detect a braking torque using an installation dimension, the bearing spacing and the first measurement signal and the second measurement signal, wherein the installation dimension corresponds to the spacing between an axis of rotation of the brake disk and the first bearing point;
- an interface for reading in a braking torque determined by the device; and
- a device for determining a braking force using a predetermined setpoint braking torque and the read-in braking torque to trigger a braking signal, wherein the brake system generates the determined brake force.

* * * * *